United States Patent [19]

Katou

[11] Patent Number: 4,660,672

[45] Date of Patent: Apr. 28, 1987

[54] METHOD AND APPARATUS FOR AUTOMATIC TRANSMISSION CRUISE CONTROL

[75] Inventor: Yuuji Katou, Zama, Japan

[73] Assignee: Nissan Motor Co., Ltd., Yokohama, Japan

[21] Appl. No.: 660,962

[22] Filed: Oct. 15, 1984

[30] Foreign Application Priority Data

Oct. 15, 1983 [JP] Japan .................................. 58-193010

[51] Int. Cl.$^4$ .............................................. B60K 31/00
[52] U.S. Cl. ..................................... 180/175; 74/868; 180/178
[58] Field of Search ............... 180/179, 178, 177, 176, 180/175; 74/866, 868, 877, 878, 336 R, 869; 364/426, 431.07, 424.1

[56] References Cited

U.S. PATENT DOCUMENTS

| | | | |
|---|---|---|---|
| 3,713,351 | 1/1973 | Sakakibara et al. | 74/645 |
| 3,732,755 | 5/1973 | Beig et al. | 74/866 |
| 4,198,882 | 4/1980 | Kiencke et al. | 74/866 |
| 4,421,192 | 12/1983 | Ito et al. | 180/179 |
| 4,506,752 | 3/1985 | Hara et al. | 180/179 |
| 4,516,652 | 5/1985 | Tanigawa | 74/866 |
| 4,563,918 | 1/1986 | Sugano | 74/869 |
| 4,580,466 | 4/1986 | Iwanaga | 74/869 |

*Primary Examiner*—David M. Mitchell
*Attorney, Agent, or Firm*—Schwartz, Jeffery, Schwaab, Mack, Blumenthal & Evans

[57] ABSTRACT

In order to prevent hunting between a selected gear ratio (e.g. overdrive) and the next lower one, when a vehicle ascends a slope or incline under "cruise control" an automatic speed control device (ASCD) which controls the opening of the engine throttle under the cruise control mode, upon being put into operation issues a control signal to the transmission control circuit which allows the latter to upshift the transmission to the predetermined gear ratio (viz., overdrive) and which renders the transmission control circuit incapable of downshifting to the next lower gear while the ASCD is functioning. Upon the vehicle speed falling a predetermined amount below the preselected target value, the ASDC issues a signal directly to the transmission to cause a downshift to the next lower gear ratio. Following such a downshift, the ASDC inhibits subsequent upshifting either for a predetermined period of time or until the load which necessitated the downshift disappears.

7 Claims, 10 Drawing Figures

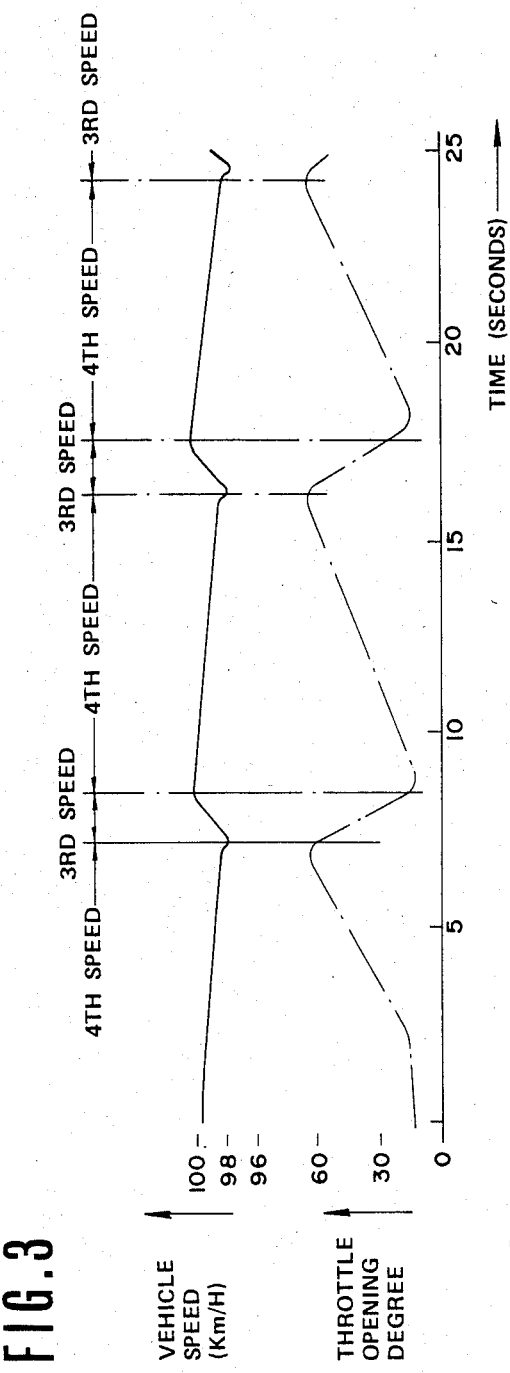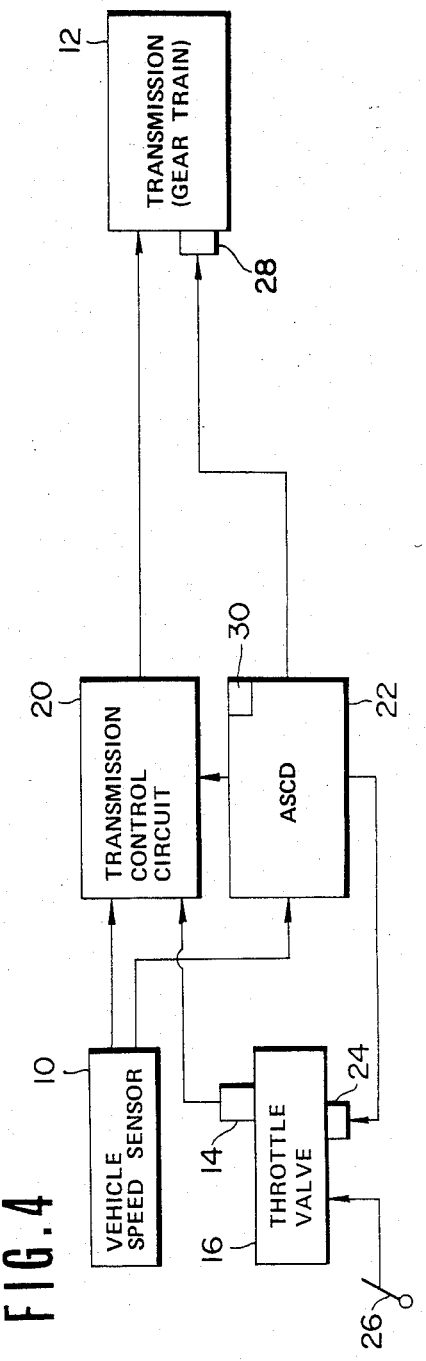

METHOD AND APPARATUS FOR AUTOMATIC TRANSMISSION CRUISE CONTROL

BACKGROUND OF THE INVENTION

1. Field of the Invention

The present invention relates generally to an automatic automotive transmission and more specifically to an improved cruise control arrangement therefor which obviates frequent downshift/upshift hunting upon the vehicle ascending a slope or the like.

2. Description of the Prior Art

FIG. 1 of the drawings shows previously proposed transmission control arrangement (disclosed on pages 80-81 of Datsun Blue Bird Service Journal No. 474 October 1982 published by Nissan Motor Co.). In this arrangement a transmission control circuit 1 (e.g. a hydraulic spool valve control circuit) receives inputs from a vehicle speed sensor 2 and a throttle position sensor 3 which outputs a signal indicative of the opening degree of the throttle valve 4 of the engine associated with the transmission 5. In this system the transmission 5 is comprised of planetary gear sets, hydraulic clutches and brakes and capable of producing four forward speeds. The system further includes an automatic vehicle speed control device (ASCD) 6 which also receives input from the vehicle speed sensor 2, and a throttle valve actuator 7 which controls the position of the throttle valve 4 in place of the normal manual control, once the system has entered so the called "cruise control" mode of operation.

However, this system has tended to suffer from a drawback in that the transmission control circuit and the automatic vehicle speed control device (ASCD) are independently arranged and accordingly function independently of each other, whereby when the vehicle in which the above described transmission system is mounted is operated under "cruise control" and ascends a slope the inclination of which is sufficient to reduce the vehicle speed, the vehicle speed control device opens the throttle of the engine to the point whereat the transmission control circuit, in accordance with its own control schedule, induces a 4-3 downshift irrespective of the fact that the target speed may be maintained by opening the throttle a little beyond that at which the control circuit brings about the downshift.

Viz., as shown in FIG. 2, if the speed falls below the vehicle speed selected to be maintained by the cruise control, a only relatively small increase in the opening of the throttle valve is required to reach the threshold at which the transmission control circuit will, according to its independent control, induce a 4-3 downshift. Subsequently, as the vehicle speed increases due to the downshift, the vehicle speed soon returns to the preselected one. However, to prevent vehicle speeds in excess of the desired value, the automatic vehicle speed control device begins closing the throttle valve. Accordingly, the threshold at which a 3-4 upshift is induced by the transmission control circuit is soon reached and the transmission is upshifted.

If the increased load which originally induces the vehicle speed reduction is still present, viz., the vehicle is still ascending the slope, the vehicle speed begins to reduce again. This induces hunting between third and fourth speeds to occur at approximately 3-4 second intervals as shown in FIG. 3.

This, while maintaining the desired vehicle speed tends to be highly disconcerting to the vehicle passengers.

To overcome this hunting problem it has been arranged for the transmission to issue a signal (A) to the automatic vehicle speed control device when the transmission control circuit induces a 4-3 downshift. This signal triggers a timer in the ASCD and causes the latter to issue a signal (B) to solenoid in the transmission which inhibits a 3-4 upshift for a preselected period of 10 to 20 seconds (for example).

This while overcomming the hunting problem incurs the drawback that the degree to which the throttle can be opened during overdrive (fourth speed) is limited thus narrowing the overdrive arrange particularly during cruise control when acceleration is not required.

SUMMARY OF THE INVENTION

It is an object of the present invention to provide an automatic automotive transmission which has a cruise control and which does not undergo the above mentioned speed ratio hunting phenomenon and which permits a widening of the range in which a predetermined gear ratio such as overdrive can operated.

In brief, the above object is achieved by an arrangement wherein, in order to prevent hunting between a selected gear ratio (e.g. overdrive) and the next lower one, when a vehicle ascends a slope or incline under "cruise control" an automatic speed control device (ASCD) which controls the opening of the engine throttle under the cruise control mode, upon being put into operation issues a control signal to the transmission control circuit which allows the latter to upshift the transmission to the predetermined gear ratio (viz., overdrive) and which renders the transmission control circuit incapable of downshifting to the next lower gear while the ASCD is functioning. Upon the vehicle speed falling a predetermined amount below the preselected target value the ASDC issues a signal directly to the transmssion to cause a downshift to the next lower gear ratio. Following such a downshift the ASDC inhibits subsequent upshifting either for a predetermined period of time or until the load which necessitated the downshift disappears.

More specifically, the present invention in its broadest aspect takes the form of a method of automatically controlling the speed of an automotive vehicle having an engine and a transmission, at a preselected target value, comprising the steps of: using a vehicle speed control device to vary the opening degree of a throttle valve associated with the engine in place of a manually produced signal in a manner to maintain the preselected target speed; rendering a transmission control ciruit which controls the shifting of the transmission between a plurality of forward speed ratios, incapable of dowshifting the transmission from a preselected gear ratio to the next lower one once the transmission control circuit has upshifted the transmission to the predetermined gear ratio, irrespective of the changes in vehicle speed and engine load sensed by a vehicle speed sensor and an engine load sensor, respectively; using the vehicle speed control device to induce a downshift from the predetermined gear ratio to the next lower one, if the load on the engine increases to a level whereat the vehicle speed falls a predetermined amount below the target level; and maintaining the downshift until a predetermined phenomenon occurs.

A more specific aspect of the invention comes in the form of an automotive vehicle including an engine a throttle valve, a throttle valve position sensor for generating a first signal indicative of the position of the throttle valve, a vehicle speed sensor for generating a second signal indicative of the speed of the vehicle, an automatic transmission having a plurality of forward speeds, a transmission control circuit for controlling the shifting between the plurality of forward speeds in response to the first and second signals, selectively operable vehicle speed control means which is responsive to the second signal for: (a) rendering the transmission control circuit incapable of downshifting the transmission from a predetermined gear ratio to the next lower one upon having upshifted the transmission to the predetermined gear ratio, (b) controlling the position of the throttle valve in a manner to maintain the vehicle speed essentially constant at a preselected target value, (c) issuing a downshift command to the transmission to cause a downshift from the predetermined gear ratio to the next lower one upon the load on the engine increasing to a level whereat the vehicle speed falls a predetermined amount below the target level and (d) maintaining the downshift condition until a predetermined phenomenon occurs.

BRIEF DESCRIPTION OF THE DRAWINGS

The features and advantages of the arrangement of the present invention will become more clearly appreciated from the following description taken in conjunction with the accompanying drawings in which:

FIG. 3 is a chart showing, in terms of throttle valve opening and time, the third/fourth speed hunting phenomenon which plagues the FIG. 1 arrangement;

FIG. 4 is a schematic diagram of a transmission control system according to a first embodiment of the present invention;

DETAILED DESCRIPTION OF THE PREFERRED EMBODIMENTS

Figure 1:
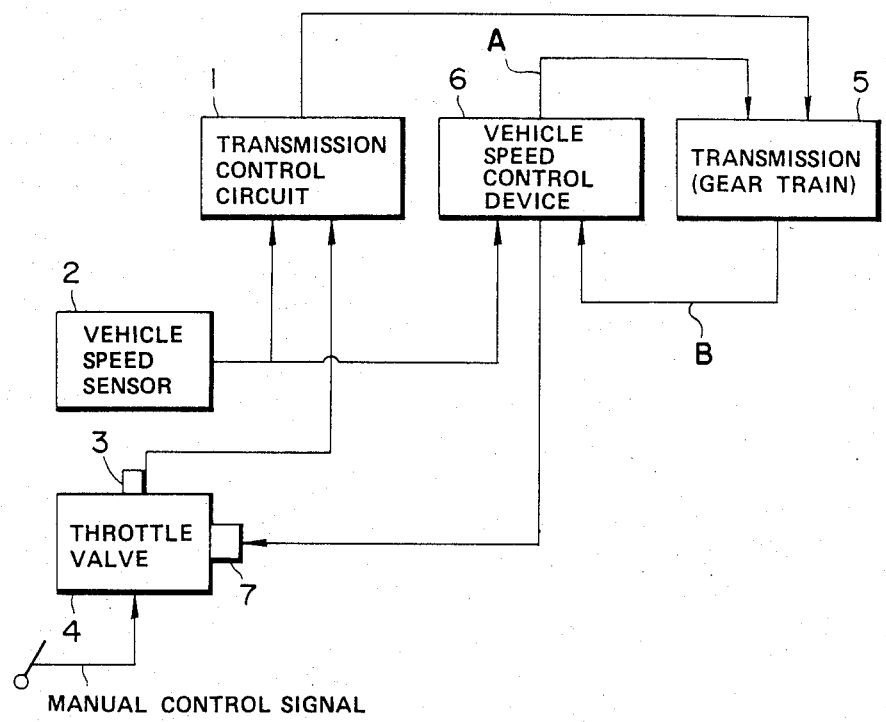
FIG. 1 is a schematic diagram showing the prior art transmission control system discussed briefly in the opening paragraphs of the present disclosure.

FIG. 4 shows, in schematic form, a transmission system which is equipped with a first embodiment of the present invention. This system includes a vehicle speed sensor 10 which is capable of generating a vehicle speed signal. This device may take the form of a sensor which outputs an electrical signal indicative of vehicle speed (preferred in this instance due to the ease with which it can be used in conjunction with an electronic control device such as a microprocessor) or alternatively the governor valve of the transmission 12 which of course outputs a hydraulic signal the pressure of which varies with vehicle speed. The system further includes a load sensor 14. This sensor may take the form an device which is connected with the engine throttle valve 16 in a manner to output an electrical signal which indicates the throttle position (again preferred due to the ease of use with electronic control apparatus) or alternatively take the form of transmission throttle valve which outputs a corresponding hydraulic signal.

In this embodiment the gear train or transmission 12 per se of the system takes the form of a four forward speed planetary gear transmission. Operatively connected with the transmission in a well known manner is a transmission control circuit 20. In this embodiment the control circuit takes the form a hydraulic spool valve system which is arranged to selectively control the supply of hydraulic pressure to the brakes and clutches associated with the planetary gear train. This control circuit is arranged to control the shifting of transmission 12 in accordance with a control schedule of the nature shown in FIG. 3. An example of the above type of transmission control circuit is disclosed in copending U.S. Pat. No. 4,563,918 issued on Jan. 14, 1986 in the name of Sugano (or the correponding European Patent Application No. 83107503.1 filed in July 29, 1983 by Nissan Motor Co). The content of this document is hereby incorpated by reference thereto. For further disclosure relating to transmission control circuits including overdrive controls, reference may be had to "Nissan OD type Automatic Transmissions (L4N71B, E4N71B)" published in November 1982.

The system further includes an automatic vehicle speed control device (ASCD) 22. In this embodiment this device receives an input from the vehicle speed sensor 10 as shown. This unit 22 is arranged to control (during the cruise control mode of operation) the operation of (a) an actuator 24 which controls the position of the throttle valve 16 in place of the manual control signal derived via depression of the accelerator pedal 26 and (b) a solenoid valve 28 which when energized induces a 4-3 downshift and maintains same until de-energized. An example of the above mentioned solenoid valve (viz., valve 28) may found in the above mentioned U.S. Pat. No. 4,563,918 in connection with element 42 disclosed therein. An example of the above mentioned actuator may be found on page 117 of the Nissan Service Journal No. 429 published in November 1980.

In this embodiment the automatic vehicle speed control device 22 is arranged to, upon being put into operation, issue a signal to the transmission control circuit which conditions the circuit in a manner that it may upshift the transmission to fourth speed but is prevented from downshifting same to third. This particular control may be accomplished by providing a valve arrangement such as disclosed in copending U.S. Pat. No. 4,580,466 issued on Apr. 8, 1986 in the name of Iwanaga (or the corresponding European Patent Application No. 84101302.2 filed on Feb. 8, 1984 in the name of Nissan Motor Co.) in connection with elements 170 and 186 of the present invention. This valve arrangement is provided for the purposes of alleviating select shock by boosting the governor pressure fed to the shift valves to line pressure level to ensure that all of the shift valves are in their respective upshift positions when the selector valve is moved from neutral to D range. By using the same type of valve in the arrangement disclosed in U.S. patent application Ser. No. 4,563,918 upon the ASCD being put into control by boosting governor pressure to line pressure would ensure the upshift positions of the shift valve were maintained until the solenoid valve 28 was energized and line pressure fed to the 3-4 shift valve in manner which induces the valve to assume its downshift position irrespective of the governor pressure being raised to line level. Closure of the switch which induces the boosting of the governor pressure may be delayed until a pressure responsive switch responsive to the transmission being up shifted to overdrive indicates what the transmission has been so conditioned.

Figure 2:
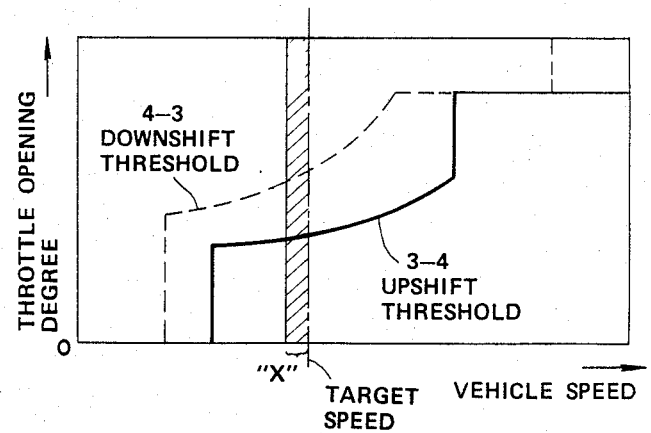
FIG. 2 shows, in terms of throttle valve opening and vehicle speed, the 3-4 upshift and 4-3 downshift patterns or schedules according to which the transmission control circuit of the FIG. 1 system controls the transmission.

When the ASCD is operating, should the load on the vehicle (and therefore the engine) increase to the point that the vehicle speed falls a predetermined amount below the desired cruising speed (see FIG. 2), the automatic vehicle speed control device 22 energizes the 4-3 downshift control solenoid valve 28 to produce the necessary downshift. Viz., as previously mentioned upon energization of this valve line pressure is fed to the 3-4 shift valve in a manner which overcomes the boosted governor pressure and induces a 4-3 downshift.

After a downshift a timer 30 included in the speed control unit 22 is triggered and a subsequent upshift inhibited by continuous energization of the solenoid valve 28 for a preselected period of approximately 10 to 20 seconds.

The operation of the first embodiment may be placed under the control of a microprocessor or like circuit (incorporated in the vehicle speed control unit 22) which is programed in a manner that the steps set forth hereinlater are executed.

Figure 5:
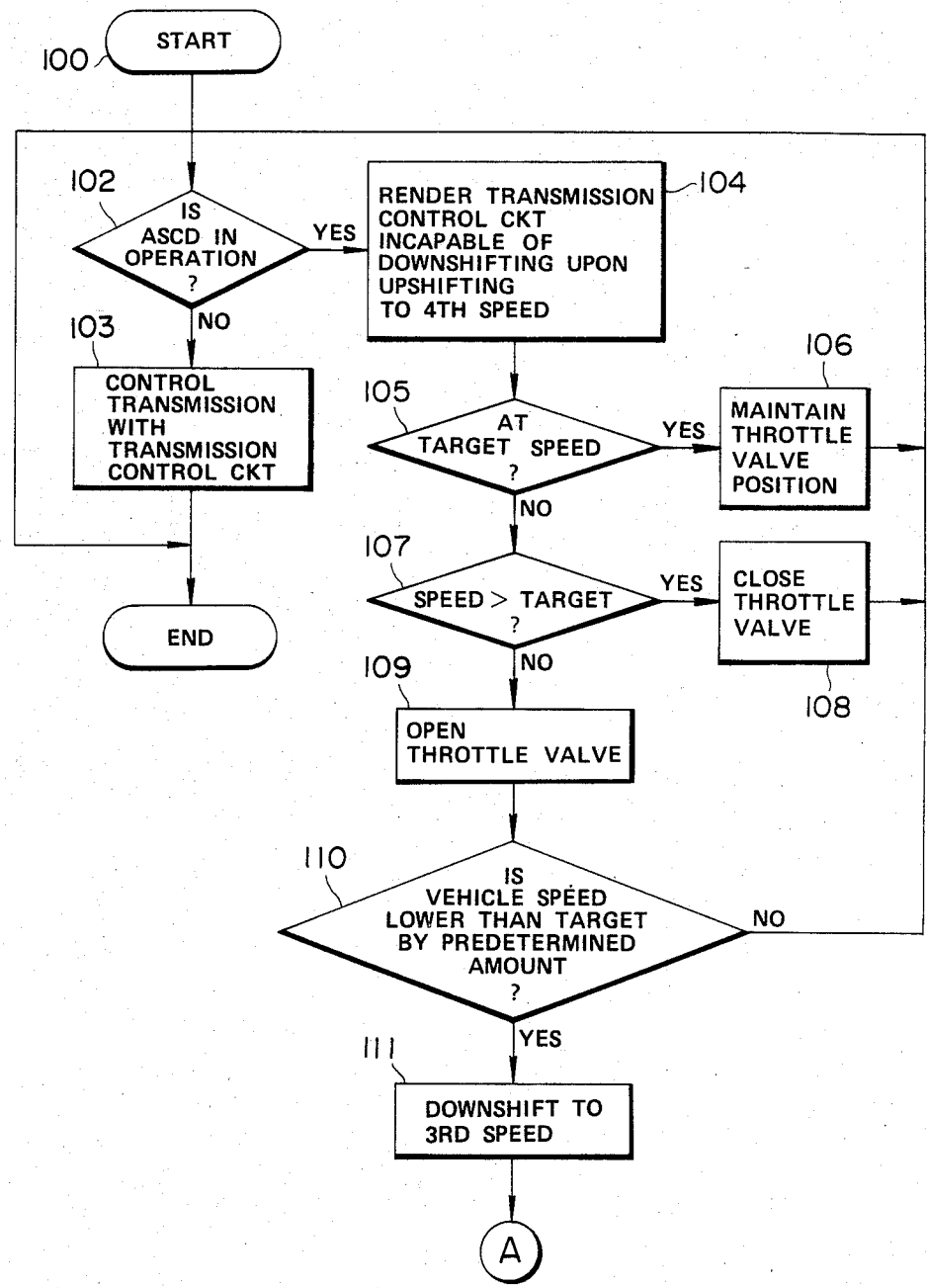
FIGS. 5 and 6 show a flow chart illustrating the steps which characterize the operation of a first embodiment of the present invention.
Figure 6:
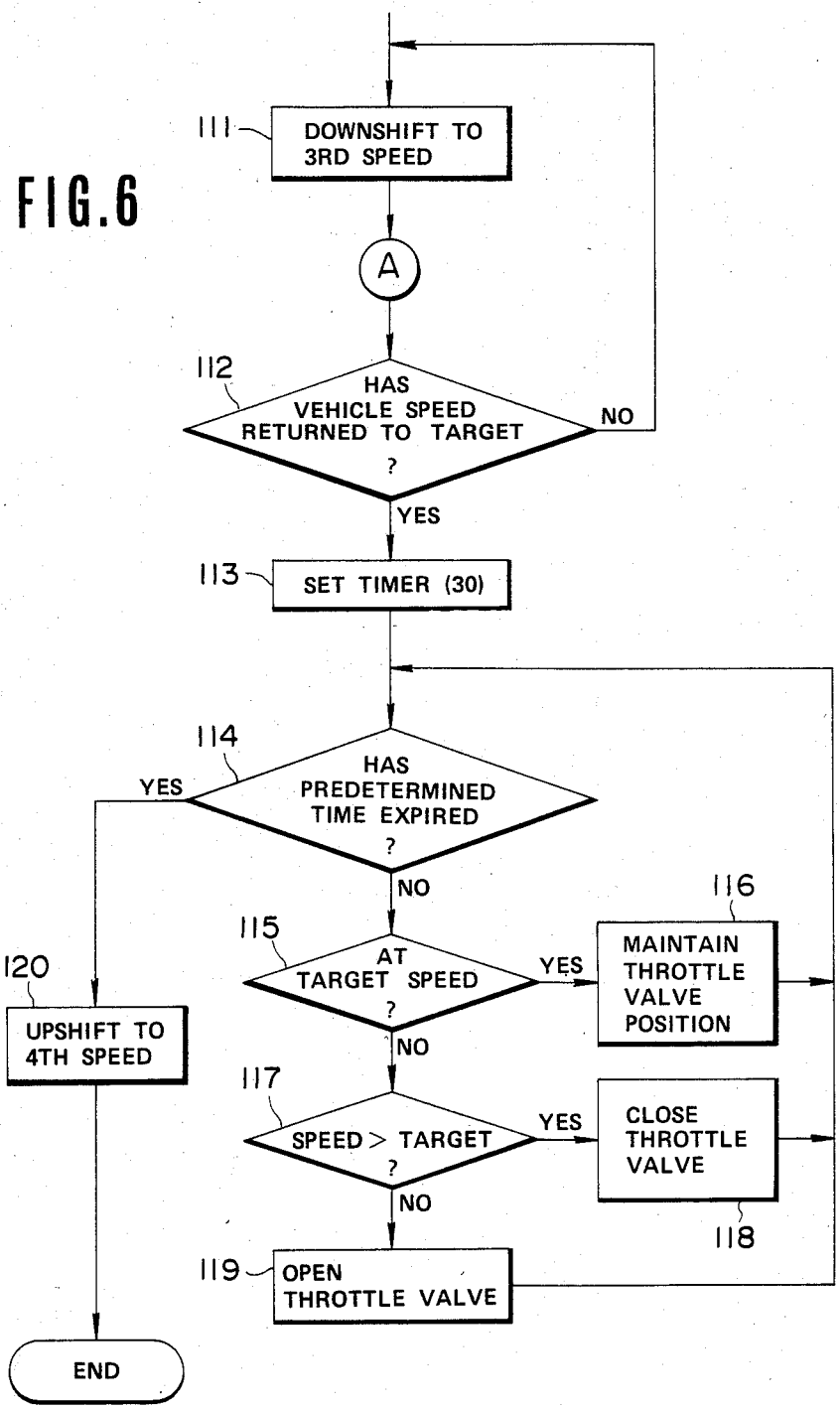

FIGS. 5 and 6 show a flow chart which illustrates the control process which characterizes the operation of the first embodiment.

As shown in FIG. 5, subsequent to START (step 100) an enquiry is made (step 101) as to whether the automatic vehicle speed control device has been put into operation or not. If the result of this enquiry is NO then the program proceeds to step 102 wherein the decision is made (step 103) to permit the transmission control circuit to maintain complete control of the transmission shifting and the program terminates. However, if the answer is YES then at step 104 a command is issued by the ASCD to the transmission control circuit which conditions same to permit upshifting to fourth speed but inhibit downshifting the transmission to 3rd speed. At step 105, it is ascertained if the vehicle speed is at the preselected cruising speed. If the answer to this enquiry is YES the decision is made in step 106 to maintain the throttle valve in its present position. However, in the event that the vehicle speed is not equal to the target speed, then at step 107 the enquiry is made as to whether the vehicle speed is higher than the target level. If the vehicle speed is above that required, then at step 108 the command is issued to the actuator 24 to close the throttle valve. However, if the vehicle speed is lower than the target value then the program proceeds to step 109 where the command to open the throttle valve is issued. Subsequently, in step 110 it is determined if the vehicle speed has decreased below the target value by more than a predetermined amount (see "X" in FIG. 2). If in fact the vehicle speed has not fallen by the just mentioned amount, then the program recycles to start. However, if the vehicle speed has fallen by more than the predetermined amount (see "X" in FIG. 2) then the program proceeds to step 111 wherein the command to energize solenoid valve 28 and downshift the transmission, is issued.

In order to appropriately maintain the downshift, the program in step 112 determines if the vehicle speed has increased to the target level. If not, then the program recycles to just upstream of step 111. However, if the speed has risen to the target level due to the downshift, then at step 113 timer 30 is set.

At step 114 it is determined if the predetermined period to be counted by the counter 30 has expired. If not, then at step 115 the enquiry is made to ascertain if the vehicle speed is at the desired target level. If the desired speed has been obtained, then at step 116 the decision is made to maintain the throttle valve in its present position. However, if the outcome of this enquiry is negative, then at step 117 it is determined, if the vehicle speed is above the the target level or not. If the outcome of this enquiry is YES then at step 118 the command to close the throttle valve is issued. On the other hand, if the vehicle speed is below the target value, then at step 119 the command to open the throttle is issued and the program recycles to just upstream of step 114.

Upon the expiry of the time counted by timer 30 set in step 113, the command is issued in step 120 to upshift the transmission to fourth speed and the program terminates.

As will be appreciated with this embodiment, during cruise control, downshifting is effected exclusively by the ASCD (unless overridded by a manual command such as depression of the accelerator pedal) and if the vehicle speed continues to fall below the desired cruising speed, then a downshift is effect and held for a minimum of 10 to 20 seconds. This of course eliminates the 4-3 hunting phenomenon while permitting the expansion of the fourth speed range.

Figure 7:
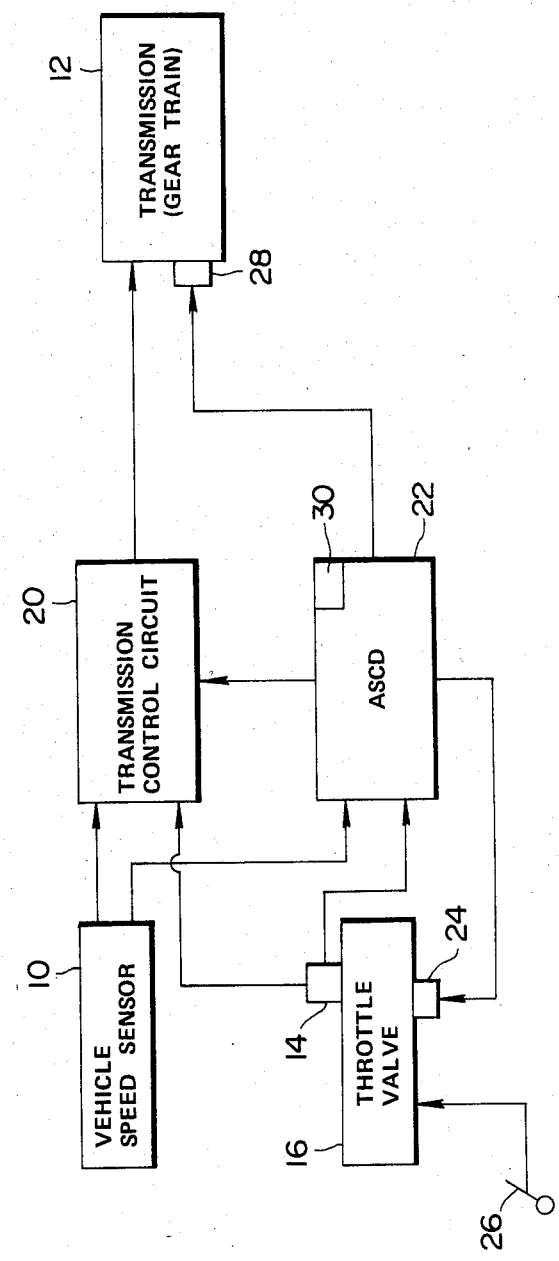
FIG. 7 shows a second embodiment of the present invention.

FIG. 7 shows a second embodiment of the present invention. This embodiment differs from the first in that the ASCD receives both vehicle speed and throttle position signals and inhibits an uphshift in the event that the vehicle speed cannot be maintained in fourth speed until the load on the engine which induced the downshift disappears.

Figure 8:
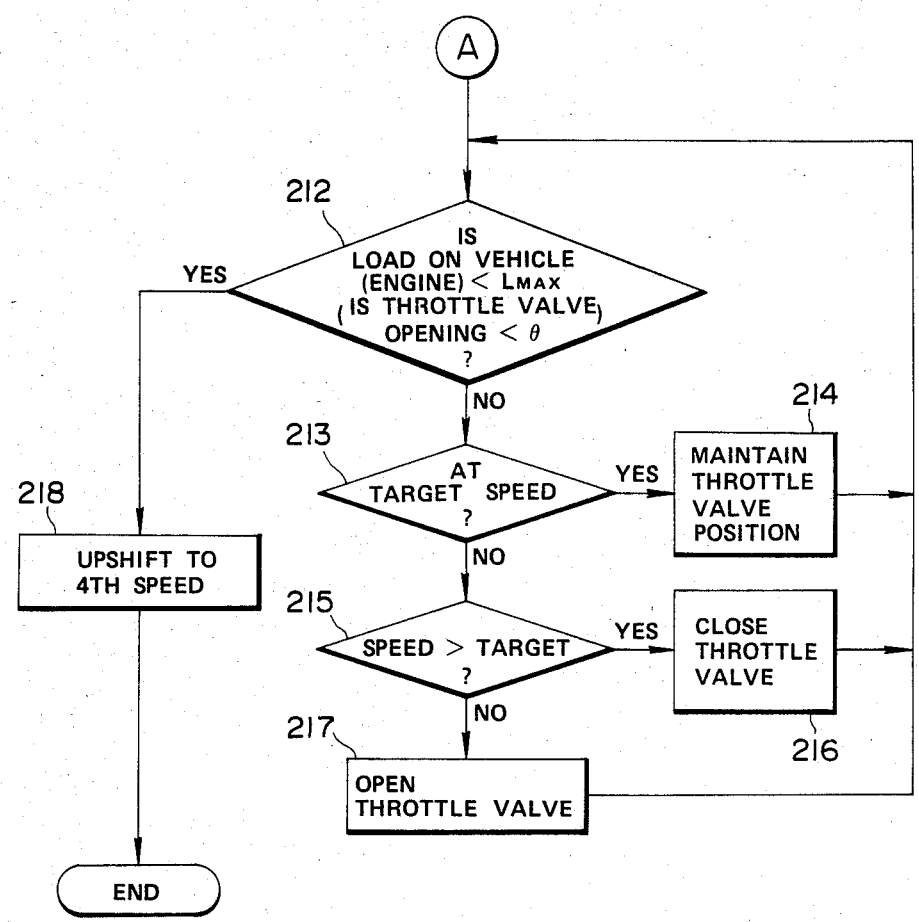
FIG. 8 shows a portion of a flow chart which illustrates the steps which characterize the operation of a second embodiment of the present invention.

FIG. 8 shows the steps which characterize the control provided by the second embodiment. The flow chart shown in FIG. 8 continues on from that shown in FIG. 6.

In step 212 the enquiry is made as to whether the vehicle (viz., the engine) is subject to a load less than a maximum load ($L_{MAX}$). That is to say, it is determined if the load on the engine is such that the target speed can be maintained in third speed without opening the throttle valve beyond a predetermined angle $\theta$. If so then the load on the engine is less than $L_{MAX}$ and the engine is capable of producing sufficient torque to maintain the target speed if the transmission is upshifted to fourth speed and the throttle opened accordingly.

Steps 213 to 218 are essentially the same as steps 115 to 120 disclosed in connection with the flow chart shown in FIG. 6. Accordingly, a detailed description of same will be omitted for brevity.

Figure 9:
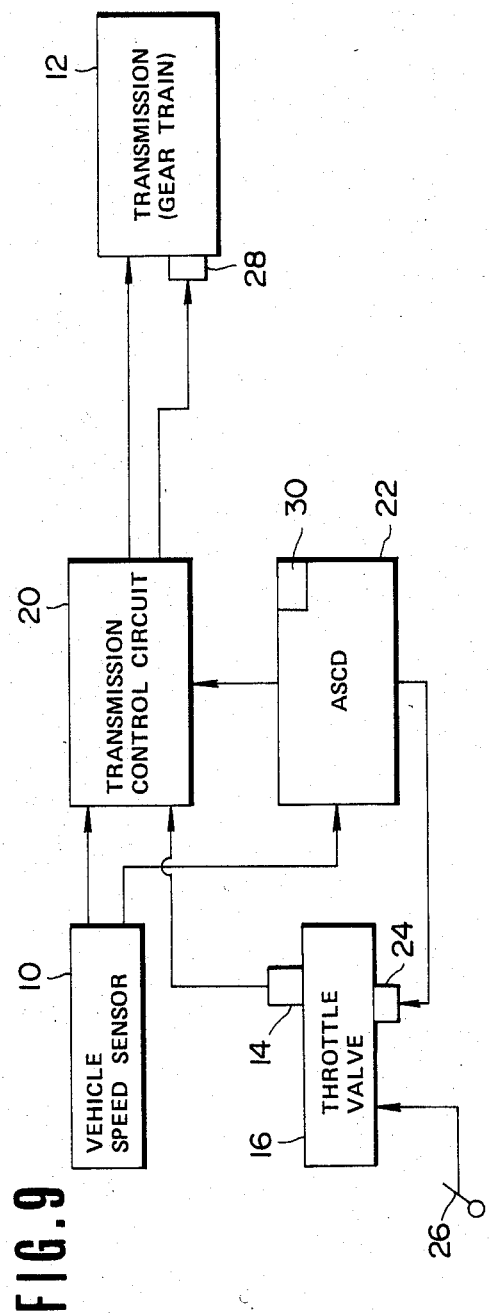
FIGS. 9 and 10 show third and fourth embodiments of the present invention respectively.
Figure 10:
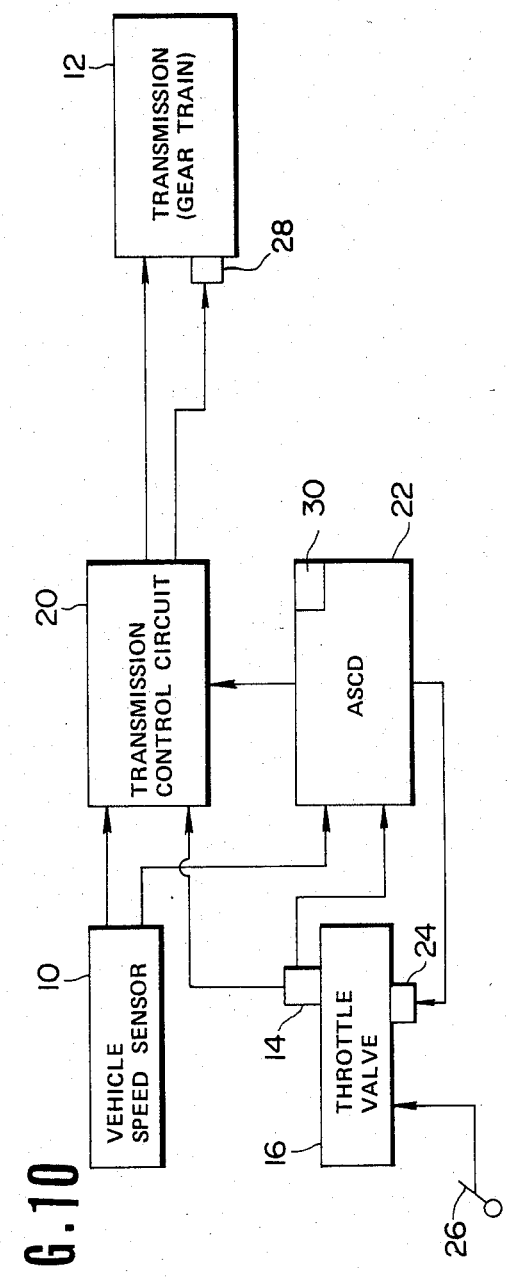

FIGS. 9 and 10 show third and fourth embodiments of the present invention, respectively. These embodiments are characterized in that as the transmission control circuit used to control the transmissions including overdrives, also includes elements such as power transistors and the like for the purposes of overdrive control, the corresponding elements are omitted from the ASCD and the latter circuited with the control circuit in a manner to make use of the power transistors etc., previously mentioned. This of course avoids undesirable duplication and thus enables a simplification of the control circuitry included in the ASCD and thus a desirable simplification of the system as a whole. Otherwise the third and fourth embodiments are essentially the same as the first and second ones and as such no further description deemed necessary.

As will be appreciated, even though one full run of the above described programs is apt to take considerable time, a hard wire interrupt may be performed at regular intervals to allow other control programs to be run without consuming excessive amounts of CPU time.

It will be also noted that even though the figures show the transmission control circuit and the automatic vehicle speed control device using the same vehicle speed and load signals, it is possible that the transmission control circuit use the governor and throttle pressures inherently provided therein which the vehicle speed control unit receive electrical signals from independent sources, as long no notable deviation occurs between the corresponding signals.

What is claimed is:

1. A method of automatically controlling the speed of an automotive vehicle having an engine and a transmission, at a preselected target value comprising the steps of:
    actuating a vehicle speed control device to control an actuator operatively connected with a throttle valve of said engine in a manner to vary the opening degree of said throttle valve in place of a manually produced signal in a manner to maintain said preselected target speed;
    rendering a transmission control circuit which is discrete from said vehicle speed control device and which controls the shifting of said transmission between a plurality of forward speed ratios in accordance with a predetermined shift schedule, incapable of downshifting said transmission from a preselected gear ratio to the next lower one once said transmission control circuit has upshifted said transmission to said predetermined gear ratio irrespective of the changes in vehicle speed and engine load at all times when said speed control device is actuated;
    using said vehicle speed control device to induce a downshift from said predetermined gear ratio to the next lower one, if the load on said engine increases to a level whereat the vehicle speed falls a predetermined amount below said target level; and
    maintaining said downshift until a predetermined phenomenon occurs.

2. A method as claimed in claim 1, wherein said step of maintaining said downshift includes holding said downshift for a predetermined period of time after the downshift occurs and the vehicle speed has returned to said target level.

3. In an automotive vehicle
    an engine having a throttle valve;
    a throttle valve position sensor for generating a first signal indicative of the position of said throttle valve;
    an actuator for moving said throttle valve;
    a vehicle speed sensor for generating a second signal indicative of the speed of said vehicle;
    an automatic transmission having a plurality of forward speeds;
    a transmission control circuit for controlling the shifting between said plurality of forward speeds in response to said first and second signals;
    a solenoid valve integrated with said transmission control circuit, said solenoid valve being operable to selectively inhibit said transmission from operating in a preselected gear ratio;
    selectively operable vehicle speed control means which is responsive to said second signal for:
        (a) rendering said transmission control circuit incapable of downshifting said transmission from said predetermined gear ratio to the next lower one upon having upshifted said transmission to said predetermined gear ratio at all times when said speed control means is operating;
        (b) controlling said actuator in a manner to control the position of said throttle valve so as to maintain the vehicle speed essentially constant at a predetermined target value;
        (c) issuing a downshift command to said solenoid valve to cause a downshift from said predetermined gear ratio to the next lower one upon the load on said engine increasing to a level whereat the vehicle speed falls a predetermined amount below said target value; and
        (d) maintaining said downshift condition until a predetermined phenomenon occurs.

4. A vehicle as claimed in claim 3, wherein said transmission takes the form of a four forward speed transmission wherein said fourth speed is an overdrive ratio and wherein said predetermined gear ratio is said fourth speed ratio.

5. A vehicle as claimed in claim 3, wherein said predetermined phenomenon is the expiry of a predetermined time from the time of downshift and the return of the vehicle speed to said target level.

6. In an automotive vehicle
    an engine having a throttle valve;
    a throttle valve position sensor for generating a first signal indicative of the position of said throttle valve;
    an actuator for moving said throttle valve;
    a vehicle speed sensor for generating a second signal indicative of the speed of said vehicle;
    an automatic transmission having a plurality of forward speeds;
    a transmission control circuit for controlling the shifting between said plurality of forward speeds in response to said first and second signals;
    a solenoid valve integrated with said transmission control circuit, said solenoid valve being operable to selectively inhibit said transmission from operating in a preselected gear ratio;
    selectively operable vehicle speed control means which is responsive to said second signal for:
        (a) rendering said transmission control circuit incapable of downshifting said transmission from said predetermined gear ratio to the next lower one upon having upshifted said transmission to said predetermined gear ratio;
        (b) controlling said actuator in a manner to control the position of said throttle valve so as to maintain the vehicle speed essentially constant at a predetermined target value;
        (c) issuing a downshift command to said solenoid valve to cause a downshift from said predetermined gear ratio to the next lower one upon the load on said engine increasing to a level whereat the vehicle speed falls a predetermined amount below said target value; and (d) maintaining said downshift condition until the reduction of the load on said engine to a level whereat said preselected vehicle speed can be maintained in said next lower gear ratio without opening said throttle valve beyond a predetermined limit.

7. A method of automatically controlling the speed of an automotive vehicle having an engine and a transmission, at a preselected target value comprising the steps of:

using a vehicle speed control device to vary the opening degree of a throttle valve associated with said engine in place of a manually produced signal in a manner to maintain said preselected target speed;

rendering a transmission control circuit which controls the shifting of said transmission between a plurality of forward speed ratios, incapable of downshifting said transmission from a preselected gear ratio to the next lower one once said transmission control circuit has upshifted said transmission to said predetermined gear ratio irrespective of the changes in vehicle speed and engine load sensed by a vehicle speed sensor and an engine load sensor, respectively;

using said vehicle speed control device to induce a downshift from said predetermined gear ratio to the next lower one, if the load on said engine increases to a level whereat the vehicle speed falls a predetermined amount below said target level; and maintaining said downshift until the load on said engine which induced said downshift reduces to a level whereat said vehicle can be operated at the target speed without opening said throttle valve beyond a predetermined amount while said transmission is in said next lower gear ratio.

* * * * *